United States Patent
Cui et al.

(10) Patent No.: US 10,060,723 B2
(45) Date of Patent: Aug. 28, 2018

(54) METHOD AND EQUIPMENT BASED ON MULTI-CORE FIBER BRAGG GRATING PROBE FOR MEASURING STRUCTURES OF A MICRO PART

(71) Applicant: Harbin Institute of Technology, Harbin, Heilongjiang (CN)

(72) Inventors: Jiwen Cui, Heilongjiang (CN); Kunpeng Feng, Heilongjiang (CN); Junying Li, Heilongjiang (CN); Jiubin Tan, Heilongjiang (CN)

(73) Assignee: HARBIN INSTITUTE OF TECHNOLOGY, Nangang District, Harbin, Heilongjiang (CN)

( * ) Notice: Subject to any disclaimer, the term of this patent is extended or adjusted under 35 U.S.C. 154(b) by 220 days.

(21) Appl. No.: 15/112,179

(22) PCT Filed: Dec. 25, 2014

(86) PCT No.: PCT/CN2014/094987
§ 371 (c)(1),
(2) Date: Jul. 17, 2016

(87) PCT Pub. No.: WO2015/106621
PCT Pub. Date: Jul. 23, 2015

(65) Prior Publication Data
US 2016/0334203 A1    Nov. 17, 2016

(30) Foreign Application Priority Data

Jan. 17, 2014 (CN) .......................... 2014 1 0030736
Jan. 17, 2014 (CN) .......................... 2014 1 0030737
(Continued)

(51) Int. Cl.
G01B 11/00   (2006.01)
G01B 5/012   (2006.01)
(Continued)

(52) U.S. Cl.
CPC ............ G01B 11/007 (2013.01); G01B 5/012 (2013.01); G01B 11/18 (2013.01); G01D 5/3538 (2013.01); *G01D 5/35316* (2013.01)

(58) Field of Classification Search
CPC ...... G01B 11/007; G01B 5/012; G01B 11/18; G01B 5/201; G01B 7/012; G01D 5/35316; G01D 5/3538
(Continued)

(56) References Cited

U.S. PATENT DOCUMENTS

2014/0202015 A1* 7/2014 Briggs .................. G01B 5/012
33/503
2016/0305764 A1* 10/2016 Cui ........................ G01B 5/012
(Continued)

FOREIGN PATENT DOCUMENTS

CN            1466673 A        1/2004
CN          101871771 A       10/2010
(Continued)

*Primary Examiner* — Yaritza Guadalupe-McCall
(74) *Attorney, Agent, or Firm* — Global IP Services; Tianhua Gu

(57) ABSTRACT

A method and equipment based on multi-core fiber Bragg grating (FBG) probe for measuring structures of a micro part are provided. The provided method relates to how to accomplish measuring structures of a micro part by transforming two or three-dimensional contact displacements into spectrum shifts of the multi-core FBG probe, and to reconstruct the structure geometry of a micro part. The provided equipment can be used to bring the spherical tip of the multi-core FBG probe into contact with a micro part, to determine coordinates of contact points, and to reconstruct the structure geometry of a micro part. The provided method and equipment feature high sensitivity, low probing force, high inspecting aspect ratio and immunity to environment interference.

14 Claims, 6 Drawing Sheets

(30) Foreign Application Priority Data

Jan. 17, 2014 (CN) .......................... 2014 1 0030738
Jan. 17, 2014 (CN) .......................... 2014 1 0030739
Jan. 17, 2014 (CN) .......................... 2014 1 0030740

(51) Int. Cl.
*G01B 11/16* (2006.01)
*G01D 5/353* (2006.01)

(58) Field of Classification Search
USPC .......................................................... 33/503
See application file for complete search history.

(56) References Cited

U.S. PATENT DOCUMENTS

2016/0334203 A1* 11/2016 Cui ........................ G01B 5/012
2017/0276868 A1* 9/2017 Cui .................... G02B 6/02209
2017/0363417 A1* 12/2017 Cui ...................... G01B 11/007
2017/0370705 A1* 12/2017 Froggatt ................. G01L 1/242
2018/0078317 A1* 3/2018 Mariampillai ......... A61B 34/20

FOREIGN PATENT DOCUMENTS

| CN | 102022980 A | 4/2011 |
| CN | 102589439 A | 7/2012 |
| CN | 103759641 A | 4/2014 |
| CN | 103759642 A | 4/2014 |
| CN | 103759643 | 4/2014 |
| CN | 103759652 A | 4/2014 |
| CN | 103759653 A | 4/2014 |
| WO | WO 2013010857 A1 | 1/2013 |

* cited by examiner

Figure 6A:
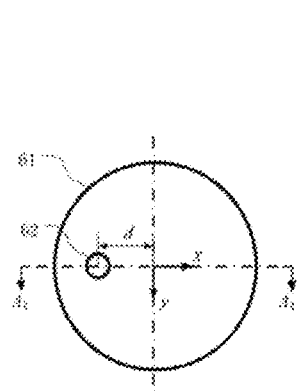
Figure 6B:
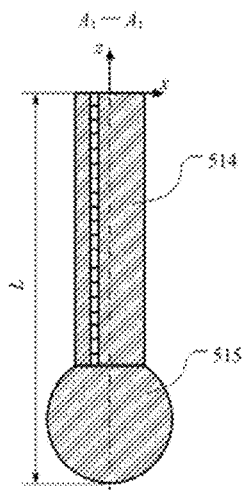
Figure 6C:
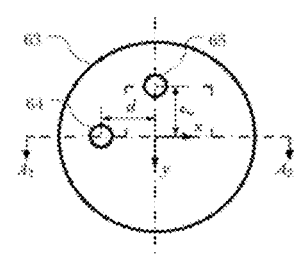
Figure 6D:
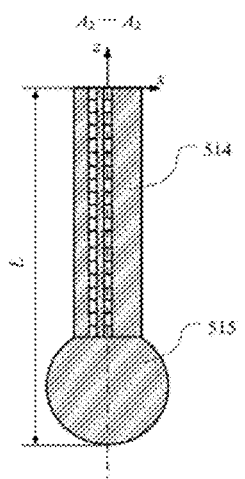
Figure 6E:
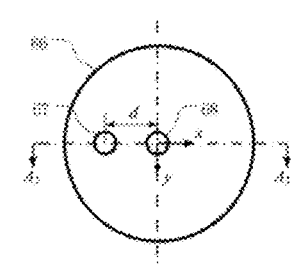
Figure 6F:
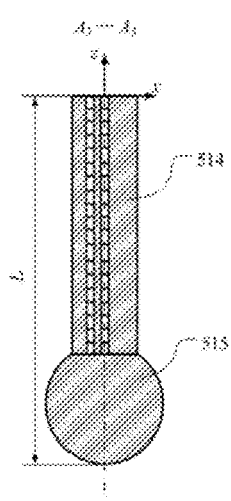
Figure 6G:
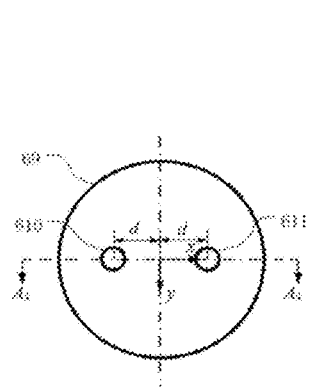
Figure 6H:
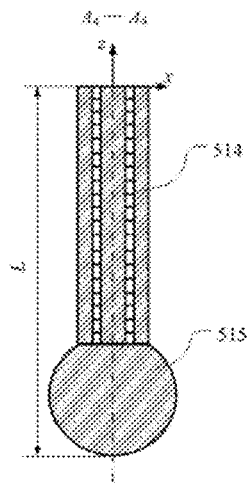
Figure 6I:
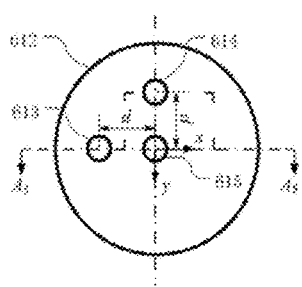
Figure 6J:
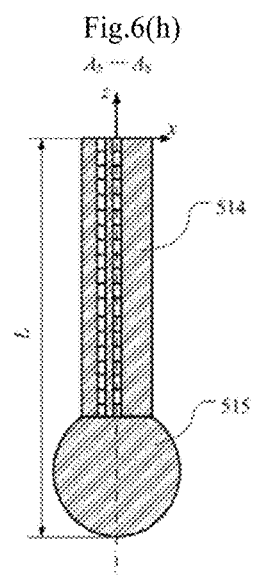
Figure 6K:
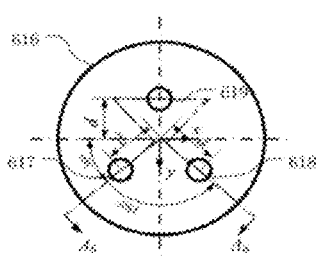
Figure 6L:
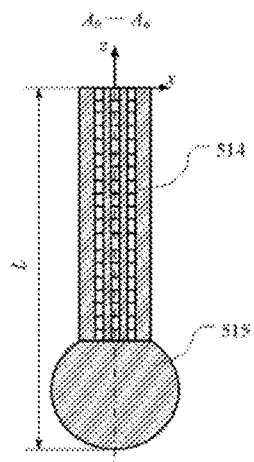

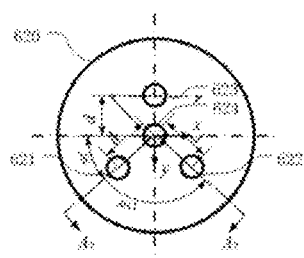 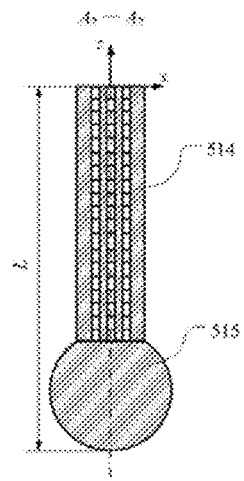
Fig.6(m)  Fig.6(n)
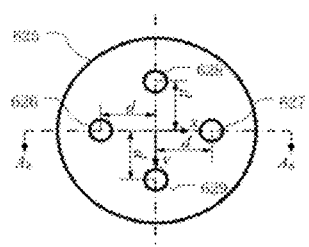 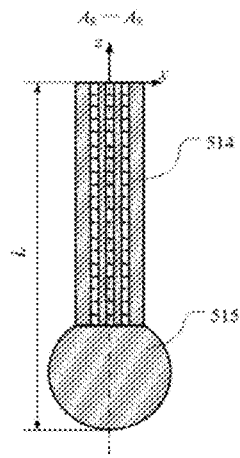
Fig.6(o)  Fig.6(p)
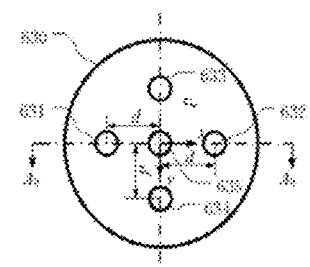 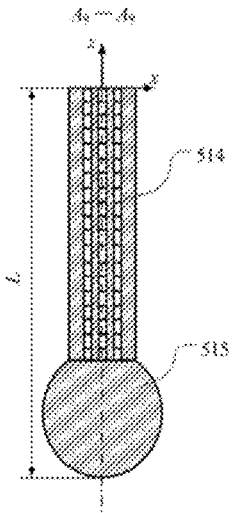
Fig.6(q)  Fig.6(r)

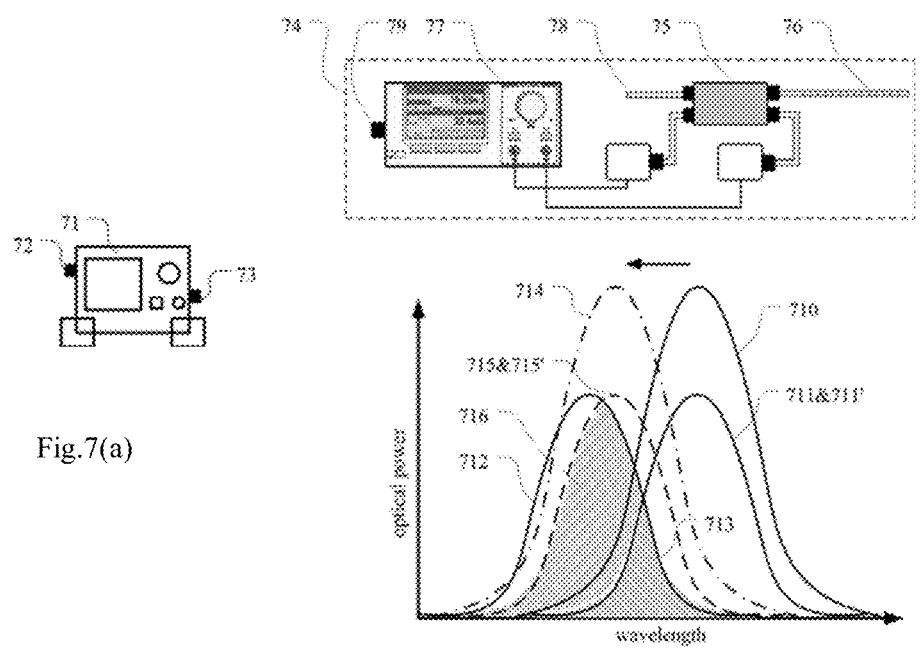
Fig.7(a)
Fig.7(b)
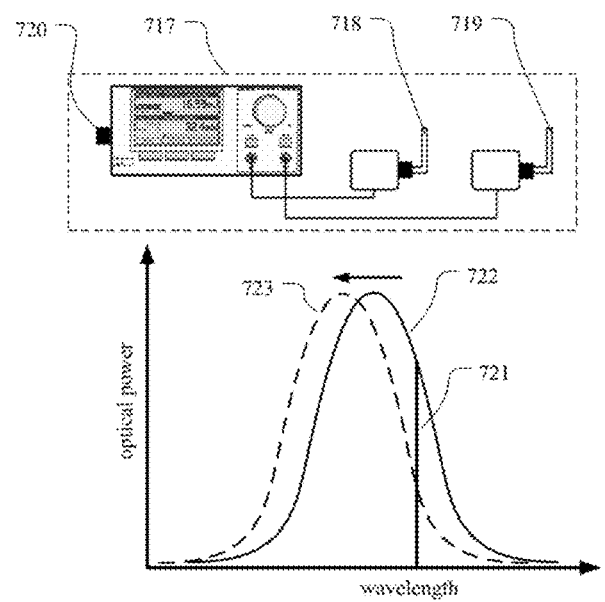
Fig.7(c)

METHOD AND EQUIPMENT BASED ON MULTI-CORE FIBER BRAGG GRATING PROBE FOR MEASURING STRUCTURES OF A MICRO PART

CROSS REFERENCE TO RELATED PATENT APPLICATION

The present application is the US national stage of PCT/CN2014/094987 filed on Dec. 25, 2014, which claims the priorities of the Chinese patent applications No. 201410030740.X filed on Jan. 17, 2014, 201410030736.3 filed on Jan. 17, 2014, 201410030737.8 filed on Jan. 17, 2014, 201410030738.2 filed on Jan. 17, 2014, 201410030739.7 filed on Jan. 17, 2014, which applications are incorporated herein by reference.

FIELD OF INVENTION

The invention relates to a method based on multi-core FBG probe for measuring structures of a micro part, wherein structure measurement of a micro part is accomplished by transforming two or three-dimensional contact displacements into spectrum shifts of the multi-core FBG probe and the structure geometry of a micro part is reconstructed. The invention also relates to an equipment based on multi-core FBG probe for measuring structures of a micro part, and the equipment consists of a coordinate measuring instrument system, a photoelectric probing system and a measurement computer, wherein the spherical tip of the multi-core FBG probe is brought into contact with a micro part, and contact points of a micro part can be calculated from coordinates of the multi-core FBG probe relative to the coordinate measuring instrument system and contact displacements of the spherical tip of the multi-core FBG probe relative to its zero-force position measured directly using the photoelectric probing system.

DESCRIPTION OF PRIOR ART

With fast development of manufacturing technologies, more and more structures of micro parts with dimensions of 0.1~1 mm and aspect ratios of more than 10:1 are now used in an increasing number of applications, including ink-jet printer nozzles, microgroove arrays in aerospace propulsion engines, cooling vents in turbine blades, diesel fuel injection holes and devices of binary optics, which present challenges to the measurement precision and inspecting depth of existing probing systems. Therefore, it is of great significance to develop a precise probing system for measuring structures of a micro part, especially for one with a miniaturized size and high inspecting aspect ratio.

Much work has been done on this particular aspect in recent years. For example, Gaoliang Dai, Sebastian Bütefisch, Frank Pohlenz and Hans-Ulrich Danzebrink et al. invented a small silicon probe based on MEMS fabrication process, which consists of a silicon chip membrane and integrated piezoresistive elements. The piezoresistive elements are etched onto the silicon membrane to detect three-dimensional deformation, and the stylus is attached to the center of the silicon membrane. The probe tip is less than 300 μm in diameter, and the probing force achieved by the membrane system is about 100 mN. However, the fabrication process of their probe is complex and the production cost is high.

Owing to the low production cost, immune to electromagnetic interference and interruption and compact in size, more and more fiber probes have been developed in recent year for dimensional measurement. H. Schwenke, F. Wäldele, C. Weiskirch, H. Kunzmann invented a fiber probe with a fiber spherical tip to backscatter light. The stylus of this probe is 15 μm in diameter, and the spherical tip is 25 μm in diameter. The laser beam enters through the fiber and lights the fiber spherical tip. The back scattered light is imaged using a CCD camera, and contact displacements in xy-direction is thus transformed into movements of the center of the light spot in a CCD camera. This probe can further be extended to a three-dimensional system by attaching a fiber sphere to the stylus and the image of the spherical tip is reflected on a second CCD camera using a mirror. But due to shadowing effect, a CCD camera cannot obtain enough light energy to create an image, and the inspecting depth achievable with this probe is thus limited.

Jiubin Tan and Jiwen Cui invented a spherical coupling optical fiber probe. The spherical coupling optical fiber probe consists of incident fiber, effluent fiber and a spherical coupler combining double fibers fixed on the probe tip. The laser beam passes through the coupling lens to enter the coupler and comes out from the effluent fiber in the reverse direction. The return light passes through an object lens and is captured by a CCD camera with an objective lens. This probe extends the range of inspecting depth, but how to realize three-dimensional measurement and fabricate a smaller fiber coupler with a high coupling efficiency is still an open issue.

So, Jiubin Tan, Fei Wang and Jiwen Cui invented a fiber probe based on micro focal-length collimation to further extend the inspecting depth. A cylindrical lens with a focal length in micrometers is formed by a thin glass fiber stylus without coating. A parallel light source is focused by an objective lens to form a point light source. Then, the point light source is collimated by the cylindrical lens and the image fringe is acquired by a linear or area array CCD camera. This probing system has a displacement magnification of more than 10,000 because the focal length of the fiber cylindrical lens is very short. Light propagates outside high aspect ratio structures of a micro part and the inspecting depth can thus be extended. However, limitations of this approach include that the z-displacement is detected by buckling, which is not stable and may be hard to achieve true three-dimensional measurements.

For fiber probes, it is a challenge to make them sensitive to the z-displacement until a FBG probe was invented by H Ji, H-Y Hsu, L X Kong and A B Wedding. Their probe comprises FBG in the fiber stylus, and contact displacements are transformed into shifts of the center wavelength of FBG's reflection spectrum. This probe cannot be affected by shadow effect; theoretically, light can disregard the aspect ratio of structures of a micro part and propagate in the stylus of this probe. The size of this probe and probing system is also miniaturized. When the probe gets contact with a micro part in the z-direction, FBG is subjected to compression stress and the z-displacement can be readily measured. However, this probe is not sensitive to radial contact displacements because FBG is located in the neutral stress plane when it is deflected.

Above all, fiber probes have been widely applied in measuring structures of a micro part and become more suitable for its optical and mechanical features of optical conductivity, easy miniaturization and low probing force. Different methods have been designed for sensing contact displacements of fiber probes, and the followings are some of their drawbacks:

1. The inspecting depth is restricted by shadow effect. For some probes based on light backscatter, the emission light is easily obstructed or reflected by the sidewall, and a large range of the emission angle allows few particles of light to reach the photo-detector.

2. Bulk size of the probing system can hardly meet the requirement of the probing space and limits its application for measuring structures on a complex-shaped micro part with limited probing space.

3. Absence of multi-dimensional tactile sense and multi-dimension-decoupling capacity makes the measurement process complex and time-consuming. A real-time application can hardly be achieved.

4. The inspecting resolutions of fiber probes are hard to be further enhanced. Most of fiber probes have sub-micrometer resolutions only. The displacement sensitivities are too low to achieve precise measurement.

SUMMARY OF INVENTION

One purpose of the present invention is to propose a method based on multi-core FBG probe for measuring structures of a micro part, which consists of following steps:

Step 1.

Providing a multi-core FBG probe, which comprises a spherical tip and a multi-core fiber stylus inscribed FBGs in its cores. The multi-core fiber stylus, cantilevered at one end and with the spherical tip fixed on the other, serves as the multi-core FBG probe. The multi-core fiber utilized to fabricate the multi-core fiber stylus should have one or more cores located out of the center of the multi-core fiber;

Step 2.

Providing a photoelectric probing system, which consists of the multi-core FBG probe mentioned in step 1, an optical path for the operation of the multi-core FBG probe, and an interrogation unit (consisting of a demodulation unit and a signal processing unit) for detecting and processing the sensing signal of the multi-core FBG probe. When a micro part is measured, the spherical tip of the multi-core FBG probe is brought into contact with a micro part and spectra of FBGs comprised in the multi-core fiber stylus shift accordingly. The optical path supplies the multi-core FBG probe with energy and ensures the sensing signal containing spectrum shifts of FBGs in the multi-core fiber stylus and the reference FBG can reach the interrogation unit. The interrogation unit detects the sensing signal, transforms it into spectrum shifts of FBGs, and then calculates contact displacements of the spherical tip of the multi-core FBG probe relative to its zero-force position;

Step 3.

Combining the photoelectric probing system mentioned in step 2 with a coordinate measuring instrument system to form an equipment based on multi-core FBG probe for measuring structures of a micro part, contact displacements of the spherical tip of the multi-core FBG probe and coordinates of the multi-core FBG probe relative to the coordinate measuring instrument system are acquired in real time and are processed by a measurement computer, wherein coordinates of contact points can be calculated from coordinates of the multi-core FBG probe relative to the coordinate measuring instrument system and contact displacements of the spherical tip of the multi-core FBG probe relative to its zero-force position measured directly using the photoelectric probing system;

Step 4.

A micro part measured is fastened to the measurement table of the equipment based on multi-core FBG probe for measuring structures of a micro part mentioned in step 3. The motion of the measurement table and the multi-core FBG probe fixed on the sleeve of the equipment is controlled by manual operation or a measurement program. Relative motion between the multi-core FBG probe and a micro part occurs and the motion track is accurately designed to bring the spherical tip of the multi-core FBG probe into contact with a certain point of a micro part. Coordinates of a contact points can be calculated in the measurement computer mentioned in step 3;

Step 5.

Repeat the measurement process in step 4 to obtain coordinates of more contact points and the structure geometry of a micro part measured can be reconstructed from coordinates of these contact points.

The second purpose of the present invention is to propose equipment based on multi-core FBG probe for measuring structures of a micro part.

According to the second aspect of the invention, the equipment for measuring structures of a micro part consists of a coordinate measuring instrument system which is used to implement the whole measuring process and determine accurate coordinates of the multi-core FBG probe relative to the coordinate measuring instrument, a photoelectric probing system which makes the multi-core FBG probe working, demodulates the sensing signal and extracts contact displacements of the spherical tip of the multi-core FBG probe, a measurement computer which receives results of the coordinate measuring instrument system and the photoelectric probing system, calculates coordinates of contact points of a micro part being measured using according results above, plans measuring process and sends motion signal to a Computer Numerical Control (CNC) controller of the coordinate measuring instrument system.

The coordinate measuring instrument system is of standard design, which consists of a crosspiece, a sleeve adjustable in the X and Z direction, a measurement table movable in the Y direction, an instrument basement, a XYZ-counter, a CNC controller. The crosspiece and the sleeve adjustable in the X and Z direction, the crosspiece and the instrument basement, the measurement table movable in the Y direction and the instrument basement are linked with mechanical structures, respectively. The sleeve adjustable in the X and Z direction and the XYZ-counter, the measurement table movable in the Y direction and the XYZ-counter, the instrument basement and the CNC controller, the XYZ-counter and the measurement computer, and the CNC controller and the measurement computer are linked with electric cable, respectively.

The equipment based on multi-core FBG probe for measuring structures of a micro part features a photoelectric probing system, which consists of a light source, an optical circulator, a multi-channel optical switch, a multi-core fiber fan-out (which makes single mode fiber access to every core of multi-core fiber), multi-core fiber, a multi-core FBG probe consisting of a multi-core fiber stylus and a spherical tip, a reference FBG, a demodulation unit and a signal processing unit. The light source and the optical circulator, the optical circulator and the multi-channel optical switch, the multi-channel optical switch and the multi-core fiber fan-out, the multi-channel optical switch and the reference FBG, and the optical circulator and the demodulation unit are linked with single mode fiber, respectively. The multi-core fiber fan-out and the multi-core fiber stylus of the multi-core FBG probe are linked with the multi-core fiber. The multi-channel optical switch and the measurement computer, the demodulation unit and the signal processing unit, and the signal processing unit and the measurement computer are linked with electric cable, respectively.

The light source can be a broadband ASE source. When the light source is a broadband ASE source, the reflected light signal is reflection spectra of FBGs and the demodulation unit can be an optical spectrum analysis device.

The light source can be a broadband ASE source. When the light source is a broadband ASE source, the reflected light signal is reflection spectra of FBGs and the demodulation unit can be also a matching FBG pair demodulation system which consists of a 50:50 coupler, a demodulation FBG and a multi-channel optical power measuring device.

The light source can be a narrowband laser source whose wavelength is located in the range of reflection spectra of FBGs comprised in the multi-core FBG probe and the reference FBG. When the light source is a narrowband laser source, the reflected light signal is reflectivity of the spectra of FBGs at current wavelength of the narrowband laser source and the demodulation unit can be a multi-channel optical power measuring device.

The multi-core FBG probe is fabricated by inscribing FBG in the multi-core fiber etched by hydrofluoric acid or machining to reduce its diameter served as the multi-core fiber stylus. A spherical tip, fabricated by electric discharge machining, oxy-hydrogen flame machining or micro ball assembly technique, fixed on the free end of the multi-core fiber stylus. The diameter D of the multi-core fiber without coating used to fabricate the multi-core fiber stylus is usually in the range of 50 µm to 400 µm. The radii of the multi-core fiber's cores are r, and r is normally 4 µm to 6 µm. The distance d from cores of to the center of the multi-core fiber should ensure that the multi-core fiber contains the cores, that is d should be less than 0.5D–r. The diameter ratio of the spherical tip to the multi-core fiber stylus is normally in the range of 1.2~1.5. The other end of the multi-core fiber stylus is fastened to the sleeve of the coordinate measuring instrument system. The multi-core FBG probe can be 3~10 mm long, so a maximum aspect ratio of 200:1 can be achieved.

The multi-core fiber stylus of the multi-core FBG probe can be a section of eccentric single-core fiber, and wherein said multi-core fiber is the eccentric single-core fiber. The core is located on the negative direction of horizontal axis with a distance of d to the center of the eccentric single-core fiber. The horizontal and vertical axes are in the section of the multi-core fiber stylus, and the origin of horizontal and vertical axes is at the center of the multi-core fiber stylus.

The multi-core fiber stylus of the multi-core FBG probe can be a section of dual eccentric core fiber, and wherein said multi-core fiber is the dual eccentric core fiber. The first cores and the second core are located on the negative direction of horizontal axis and vertical axis with a distance of d to the center of the dual eccentric core fiber, respectively. The horizontal and vertical axes are in the section of the multi-core fiber stylus, and the origin of horizontal and vertical axes is at the center of the multi-core fiber stylus.

The multi-core fiber stylus of the multi-core FBG probe can be a section of eccentric two-core fiber, and wherein said multi-core fiber is the eccentric two-core fiber. The first core is located on the negative direction of horizontal axis with a distance of d to the center of the eccentric two-core fiber; the second core is located in the center of the eccentric two-core fiber. The horizontal and vertical axes are in the section of the multi-core fiber stylus, and the origin of horizontal and vertical axes is at the center of the multi-core fiber stylus.

The multi-core fiber stylus of the multi-core FBG probe can be a section of two-core fiber, and wherein said multi-core fiber is the two-core fiber. The first core and the second core are located on the negative and positive direction of horizontal axis with a distance of d to the center of the two-core fiber. The horizontal and vertical axes are in the section of the multi-core fiber stylus, and the origin of horizontal and vertical axes is at the center of the multi-core fiber stylus.

The multi-core fiber stylus of the multi-core FBG probe can be a section of eccentric three-core fiber, and wherein said multi-core fiber is the eccentric three-core fiber. The first core and the second core are located on the negative direction of horizontal axis and vertical axis with a distance of d to the center of the eccentric three-core fiber, respectively; the third core is located in the center of the eccentric three-core fiber. The horizontal and vertical axes are in the section of the multi-core fiber stylus, and the origin of horizontal and vertical axes is at the center of the multi-core fiber stylus.

The multi-core fiber stylus of the multi-core FBG probe can be a section of three-core fiber, and wherein said multi-core fiber is the three-core fiber. The three cores are located out the center of the three-core fiber with a distance of d to its center; the lines from the first core and the second core to the center of the three-core fiber are beveled at an angle of 30 degree and 150 degree to the negative direction of horizontal axis, respectively; the third core is located on the negative direction of vertical axis. The horizontal and vertical axes are in the section of the multi-core fiber stylus, and the origin of horizontal and vertical axes is at the center of the multi-core fiber stylus.

The multi-core fiber stylus of the multi-core FBG probe can be a section of eccentric four-core fiber, and wherein said multi-core fiber is the eccentric four-core fiber. The first core, the second core and the third core are located out the center of the eccentric four-core fiber with a distance of d to its center; the lines from the first core and second core to the center of the eccentric four-core fiber are beveled at an angle of 30 degree and 150 degree to the negative direction of horizontal axis, respectively; the third core is located on the negative direction of vertical axis; the fourth core is located in the center of the eccentric four-core fiber. The horizontal and vertical axes are in the section of the multi-core fiber stylus, and the origin of horizontal and vertical axes is at the center of the multi-core fiber stylus.

The multi-core fiber stylus of the multi-core FBG probe can be a section of four-core fiber, and wherein said multi-core fiber is the four-core fiber. The first core and the second core are located on the negative and positive direction of horizontal axis with a distance of d to the center of the four-core fiber, respectively; the third core and the fourth core are located on the negative and positive direction of vertical axis with a distance of d to the center of the four-core fiber, respectively. The horizontal and vertical axes are in the section of the multi-core fiber stylus, and the origin of horizontal and vertical axes is at the center of the multi-core fiber stylus.

The multi-core fiber stylus of the multi-core FBG probe can be a section of five-core fiber, and wherein said multi-core fiber is the five-core fiber. The first core and the second core are located on the negative and positive direction of horizontal axis with a distance of d to the center of the five-core fiber, respectively; the third core and the fourth core are located on the negative and positive direction of vertical axis with a distance of d to the center of the five-core fiber, respectively; the fifth core is located in the center of the five-core fiber. The horizontal and vertical axes are in the section of the multi-core fiber stylus, and the origin of horizontal and vertical axes is at the center of the multi-core fiber stylus.

The present invention has following advantages:

(1). High Radial Sensitivity.

Thanks to the cores located out of the center of the multi-core fiber, FBGs comprised in the multi-core fiber stylus are subjected to stress several hundreds of times larger than that in a normal single core FBG probe (such as the probe invented by H Ji et al.) with a same radial contact displacement and structure parameters. Therefore, the radial sensitivity of the multi-core FBG probe is increased by several hundreds of times.

(2) High Inspecting Aspect Ratio.

The inspecting depth is not affected by the shadowing effect by guiding optical signals propagating in the probe and separating the signal processing device from the probe. The minimum dimension of structures of a micro part to be measured can go up to 50 µm for the limit imposed by the spherical tip of the multi-core fiber, and the inspecting aspect ratio is up to 200:1.

(3) Very Low Probing Force.

The contact measurement is achieved by deflecting a thin optical fiber. The probing force is less than several tens of mN.

(4) Immunity to Environment Interference.

Optical fiber is immune to electromagnetic interference, and temperature drifts can be compensated using a reference FBG.

BRIEF DESCRIPTION OF ACCOMPANYING DRAWINGS

Figure 1:
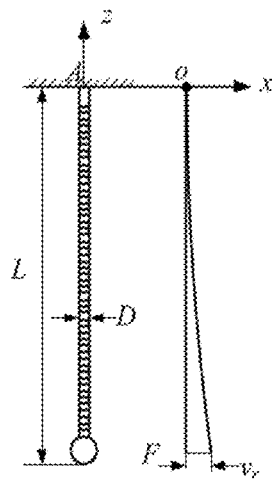
Figure 2:
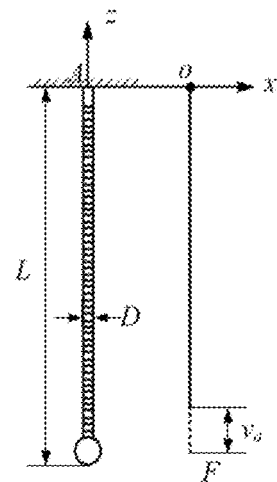
Figure 3:
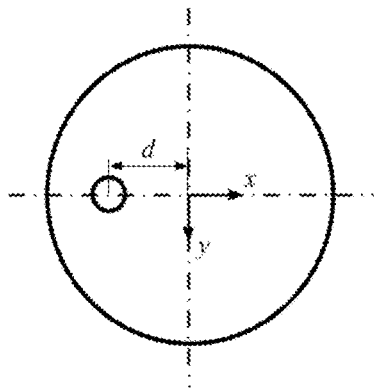
Figure 4:
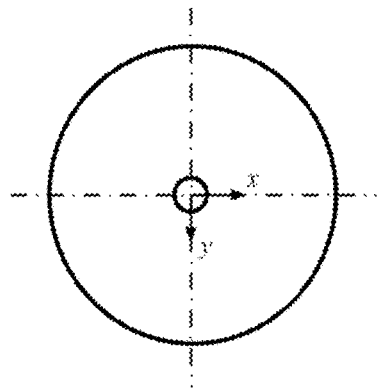
Figure 5:
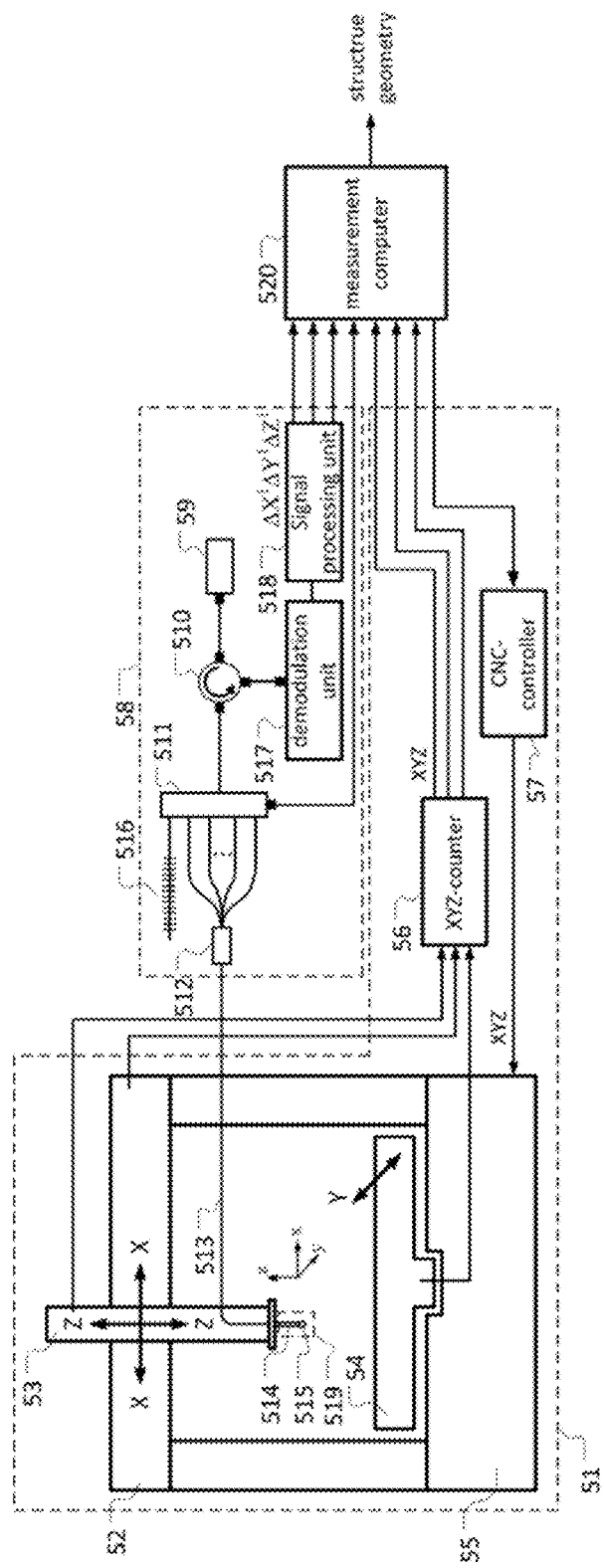

FIG. 1: a schematic illustration of the multi-core FBG probe subjected to a radial contact displacement;

FIG. 2: a schematic illustration of the multi-core FBG probe subjected to an axial contact displacement;

FIG. 3: an illustration of the fiber with a core located out the center;

FIG. 4: an illustration of the fiber with a core located in the center;

FIG. 5: construction of equipment based on multi-core FBG probe for measuring structures of a micro part;

FIG. 6 (a): a cross-sectional view of the multi-core FBG probe when the multi-core fiber stylus is embodied as an eccentric single-core fiber;

FIG. 6 (b): a section $A_1$-$A_1$ view of the multi-core FBG probe when the multi-core fiber stylus is embodied as an eccentric single-core FBG probe;

FIG. 6 (c): a cross-sectional view of the multi-core FBG probe when the multi-core fiber stylus is embodied as a dual eccentric core FBG probe;

FIG. 6 (d): a section $A_2$-$A_2$ view of the multi-core FBG probe when the multi-core fiber stylus is embodied as a dual eccentric core FBG probe;

FIG. 6 (e): a cross-sectional view of the multi-core FBG probe when the multi-core fiber stylus is embodied as an eccentric two-core FBG probe;

FIG. 6 (f): a section $A_3$-$A_3$ view of the multi-core FBG probe when the multi-core fiber stylus is embodied as an eccentric two-core FBG probe;

FIG. 6 (g): a cross-sectional view of the multi-core FBG probe when the multi-core fiber stylus is embodied as a two-core FBG probe;

FIG. 6 (h): a section $A_4$-$A_4$ view of the multi-core FBG probe when the multi-core fiber stylus is embodied as a two-core FBG probe;

FIG. 6 (i): a cross-sectional view of the multi-core FBG probe when the multi-core fiber stylus is embodied as an eccentric three-core FBG;

FIG. 6 (j): a section $A_5$-$A_5$ view of the multi-core FBG probe when the multi-core fiber stylus is embodied as an eccentric three-core FBG;

FIG. 6 (k): a cross-sectional view of the multi-core FBG probe when the multi-core fiber stylus is embodied as a three-core FBG;

FIG. 6 (l): a section $A_6$-$A_6$ view of the multi-core FBG probe when the multi-core fiber stylus is embodied as a three-core FBG;

FIG. 6 (m): a cross-sectional view of the multi-core FBG probe when the multi-core fiber stylus is embodied as an eccentric four-core FBG probe;

FIG. 6 (n): a section $A_7$-$A_7$ view of the multi-core FBG probe when the multi-core fiber stylus is embodied as an eccentric four-core FBG probe;

FIG. 6 (o): a cross-sectional view of the multi-core FBG probe when the multi-core fiber stylus is embodied as a four-core FBG probe;

FIG. 6 (p): a section $A_8$-$A_8$ view of the multi-core FBG probe when the multi-core fiber stylus is embodied as a four-core FBG probe;

FIG. 6 (q): a cross-sectional view of the multi-core FBG probe when the multi-core fiber stylus is embodied as a five-core FBG probe;

FIG. 6 (r): a section $A_9$-$A_9$ view of the multi-core FBG probe when the multi-core fiber stylus is embodied as a five-core FBG probe;

FIG. 7 (a): a schematic illustration of the demodulation unit embodied as an optical spectrum analysis device when the light source is a broadband ASE source;

FIG. 7 (b): a schematic illustration of demodulation unit embodied as a matching FBG pair demodulation system when the light source is the light source is a broadband ASE source;

FIG. 7 (c): a schematic illustration of demodulation unit embodied as a multi-channel optical power measuring device when the light source is the light source is a narrow-band laser source.

DESCRIPTION OF PREFERRED EMBODIMENTS

A method based on multi-core FBG probe for measuring structures of a micro part includes following steps:

Step 1.

Providing a multi-core FBG probe, which comprises a spherical tip and a multi-core fiber stylus inscribed FBGs in its cores. The multi-core fiber stylus, cantilevered at one end and with the spherical tip fixed on the other, serves as the multi-core FBG probe. The multi-core fiber utilized to fabricate the multi-core fiber stylus should have one or more cores located out of the center of the multi-core fiber;

In step 1, the multi-core fiber comprised FBG in its cores with a special structure is served as the multi-core FBG probe stylus. When the spherical tip of the multi-core FBG probe is subjected to a radial contact displacement, for example in axis x as shown in FIG. 1, the multi-core FBG probe can be simplified into a cantilever and the distribution of strain in the multi-core FBG probe can be expressed as:

$$\varepsilon_r(l) = -\frac{3(L-l)d}{L^3}v_r \quad (1)$$

where, l is the coordinate along the multi-core FBG probe, l=0 at the fixed end, l=L at the free end, $v_r$ is the contact displacement, d is the eccentric distance from the core to the neutral plane and L is the length of the multi-core FBG probe, respectively.

FBGs comprised in the multi-core fiber stylus are subjected to strain due to a radial contact displacement and shifts of their reflection spectra can be express as:

$$\Delta\lambda = \lambda(1-p_e)\varepsilon \quad (2)$$

where, $\lambda$ is the Bragg wavelength of FBG, $p_e$ is the effective photoelastic constant typically 0.213 for a common FBG, and $\varepsilon$ is the strain caused by the contact deformation, respectively. It can be concluded from Eq. (1) and Eq. (2) that the distribution of strain in the multi-core fiber stylus caused by a radial contact displacement along axis x is not uniform. FBGs in the multi-core fiber stylus are transformed into linear chip FBGs, and shifts of reflection spectra of linear chip FBGs are the average of shifts of reflection spectra of local FBGs at both ends of the multi-core FBG probe. By substituting Eq (1) into Eq. (2), shifts of reflection spectra of FBGs can be given by:

$$\Delta\lambda_r = -\lambda(1-p_e)\frac{3d}{2L^2}v_r \quad (3)$$

The remarkable difference between multi-core fiber and normal fiber used to fabricate the fiber stylus of a FBG probe is the cores located out of the center of the fiber stylus. It can be concluded from Eq. (3) that the reflection spectrum of FBG comprised in the core located out of the center of the fiber stylus has significant changes and can be serviced as sensing signal as a result of the eccentric distance from the core to the neutral plane as shown in FIG. 3. However, the shift of the reflection spectrum of FBG comprised in the core located in the center of fiber stylus approximates to zero as a result of d=0 as shown in FIG. 4. The structure of the core located out of the center of fiber stylus significantly improves the radial sensitivity of a FBG probe.

As shown in FIG. 2, when the multi-core FBG probe is compressed through an axial contact along axis z and uniform strain in the multi-core FBG probe can be expressed as:

$$\varepsilon_a = -\frac{v_a}{L} \quad (4)$$

where, $v_a$ is the contact displacement along axis z.

By substituting Eq (4) into Eq. (2), shifts of reflection spectra of FBGs can be given by:

$$\Delta\lambda_a = -\lambda(1-p_e)\frac{v_a}{L} \quad (5)$$

It can be concluded from Eq. (5) that the axial sensitivity of the core located out of and in the center of the multi-core fiber stylus is the same.

Step 2.

Providing a photoelectric probing system, which consists of the multi-core FBG probe mentioned in step 1, an optical path for the operation of the multi-core FBG probe, and an interrogation unit (consisting of a demodulation unit and a signal processing unit) for detecting and processing the sensing signal of the multi-core FBG probe. When a micro part is measured, the spherical tip of the multi-core FBG probe is brought into contact with a micro part and the spectra of FBGs comprised in the multi-core fiber stylus shift accordingly. The optical path supplies the multi-core FBG probe with energy and ensures the sensing signal containing spectrum shifts of FBGs in the multi-core fiber stylus and the reference FBG can reach the interrogation unit. The interrogation unit detects the sensing signal, transforms it into spectrum shifts of FBGs, and then calculates contact displacements of the spherical tip of the multi-core FBG probe relative to its zero-force position;

In step 2, the photoelectric probing system can be embodied in three ways:

The light source can be a broadband ASE source. When the light source is a broadband ASE source, the reflected light signal is reflection spectra of FBGs, and the demodulation unit can be an optical spectrum analysis device. The optical spectrum analysis device has an optical input port and an electric output port. Shifts of reflection spectra of FBGs detected by the optical spectrum analysis device are transformed into electric signal; the electric signal is send to the signal processing unit to calculate contact displacements of the spherical tip of the multi-core FBG probe relative to its zero-force position.

The light source can be a broadband ASE source. When the light source is a broadband ASE source, the reflected light signal is reflection spectra of FBGs and the demodulation unit can be also a matching FBG pair demodulation system which consists of a 50:50 coupler, a demodulation FBG and a multi-channel optical power measuring device. The matching FBG pair demodulation system has an optical input port and an electric output port. Reflection spectra of FBGs comprised in the multi-core fiber stylus of the multi-core FBG probe and the reference FBG is reflected and enters the demodulation unit. The demodulation FBG is not affected by the measurement process. Therefore, the spectrum overlap between the reflected light signal and the demodulation FBG just changes according to the spectrum shift of the reflected light signal. The optical power ratio of the reflected light signal and the spectrum overlap between the reflected light signal and the demodulation FBG is transformed into electric signal by the multi-channel optical power measuring device; the electric signal is send to the signal processing unit to calculate contact displacements of the spherical tip of the multi-core FBG probe relative to its zero-force position.

The light source can be a narrowband laser source whose wavelength is located in the range of reflection spectra of FBGs comprised in the multi-core fiber stylus of the multi-core FBG probe and the reference FBG. When the light source is a narrowband laser source, the reflected light signal is the reflectivity of the spectra of FBGs at current wavelength of the narrowband laser source and the demodulation unit can be a multi-channel optical power measuring device. The power of the reflected light signal is in related to the reflectivity of the spectra of FBGs at the wavelength of the narrowband laser source, and it changes according to shifts of reflection spectra of FBGs comprised in the multi-core fiber stylus of the multi-core FBG probe and the reference FBG. The optical power ratio of the reflected light signal and the narrowband laser source is transformed into electric signal by the multi-channel optical power measuring device; the electric signal is send to the signal processing unit to calculate contact displacements of the spherical tip of the multi-core FBG probe relative to its zero-force position.

Step 3.

Combining the photoelectric probing system mentioned in step 2 with a coordinate measuring instrument system to form an equipment based on multi-core FBG probe for measuring structures of a micro part, contact displacements of the spherical tip of the multi-core FBG probe and coordinates of the multi-core FBG probe relative to the coordinate measuring instrument system are acquired in real time and are processed by a measurement computer, wherein coordinates of contact points can be calculated from coordinates of the multi-core FBG probe relative to the coordinate measuring instrument system and contact displacements of the spherical tip of the multi-core FBG probe relative to its zero-force position measured directly using the photoelectric probing system;

In step 3, a type of equipment based on multi-core FBG probe for measuring structures of a micro part is formed, in which coordinates of the coordinate measuring instrument system and changes of the photoelectric probing system will be recorded in real time with a high speed. The photoelectric probing system is used as a trigger and the coordinate measuring instrument system offers a precise three-dimensional movement and feedback. The movement of the coordinate measuring instrument system will be stopped as soon as the spherical tip of the multi-core FBG probe contacts a micro part. Coordinates of contact points can be calculated using a program embedded within the measurement computer.

Step 4.

A micro part measured is fastened to a measurement table of the equipment based on multi-core FBG probe for measuring structures of a micro part mentioned in step 3. The motion of the measurement table and the multi-core FBG probe fixed on the sleeve of the equipment is controlled by manual operation or a measurement program. Relative motion between the multi-core FBG probe and a micro part occurs and the motion track is accurately designed to bring the spherical tip of the multi-core FBG probe into contact with a certain point of a micro part. Coordinates of a contact point can be calculated in the measurement computer mentioned in step 3;

In step 4, coordinates of a contact point of a micro part can be manually or automatically acquired using the coordinate measurement method mentioned in step 3.

Step 5.

Repeat the measurement process in step 4 to obtain coordinates of more contact points and the structure geometry of a micro part measured can be reconstructed from coordinates of these contact points.

In step 5, coordinates of a micro part are acquired using the measurement process mentioned in step 4 and the structure geometry of a micro part measured can be reconstructed according to contact points.

According to the second purpose of the present invention, equipment based on multi-core FBG probe for measuring structures of a micro part can be set up in the following ways:

As shown in FIG. 5, the equipment based on multi-core FBG probe 519 for measuring structures of a micro part consists of a coordinate measuring instrument system 51, a photoelectric probing system 58, and a measurement computer 520.

The coordinate measuring instrument system 51 consists of a crosspiece 52, a sleeve 53 adjustable in the X and Z direction, a measurement table 54 movable in the Y direction, an instrument basement 55, a XYZ-counter 56, a CNC controller 57. The crosspiece 52 and the sleeve 53 adjustable in the X and Z direction, the crosspiece 52 and the instrument basement 55, the measurement table 54 movable in the Y direction and the instrument basement 55 are linked with mechanical structures, respectively. The crosspiece 52 supports the sleeve 53 adjustable in the X and Z direction. The instrument basement 55 supports the crosspiece 52 and the measurement table 54 movable in the Y direction. The instrument basement 55 drives the measurement table 54 directly and the sleeve 53 indirectly through the crosspiece 52. The multi-core FBG probe 519 for sensing contact displacements is fixed on the sleeve 53 and can be adjustable in the X and Z direction. A micro part being measured is fastened to the measurement table 54 movable in the Y direction. The sleeve 53 adjustable in the X and Z direction and the XYZ-counter 56, the measurement table 54 movable in the Y direction and the XYZ-counter 56, the instrument basement 55 and the CNC controller 57, the XYZ-counter 56 and the measurement computer 520, and the CNC controller 57 and the measurement computer 520 are linked with electric cable, respectively. The XYZ-counter 56 is used to determine coordinate values X, Y, Z of the multi-core FBG probe 519 relative to the coordinate measuring instrument system 51, and to send coordinate values to measurement computer 520. The CNC controller 57 receives the signal from the measurement computer 520, and controls the motion of the sleeve 53 and the measurement table 54. Relative motion between the multi-core FBG probe 519 and a micro part is controlled by the CNC-controller 57 to implement CNC operations and measurement processes, and the motion track is accurately designed to bring the spherical tip 515 of the multi-core FBG probe 519 into contact with a certain point of a micro part.

The equipment based on multi-core FBG probe 519 for measuring structures of a micro part features the photoelectric probing system 58, which consists of a light source 59, an optical circulator 510, a multi-channel optical switch 511, a multi-core fiber fan-out 512, multi-core fiber 513, a multi-core FBG probe 519 consisting of a multi-core fiber stylus 514 and a spherical tip 515, a reference FBG 516, a demodulation unit 517 and a signal processing unit 518. The light source 59 and the optical circulator 510, the optical circulator 510 and the multi-channel optical switch 511, the multi-channel optical switch 511 and the multi-core fiber fan-out 512, the multi-channel optical switch 511 and the reference FBG 516, and the optical circulator 510 and the demodulation unit 517 are linked with single mode fiber, respectively. The light coming from the light source 59 goes through single mode fiber into a core of the multi-core fiber stylus 514 of the multi-core FBG probe 519 or the reference FBG 516 and then is reflected by FBGs within them. The reflected light signal as the sensing signal enters the demodulation unit 517 through the multi-core fiber 513, the multi-core fiber fan-out 512, the multi-channel optical switch 511 and the optical circulator 510, respectively. The multi-channel optical switch 511 and the measurement computer 520 are linked with electric cable. The multi-channel optical switch 511 is controlled by the measurement computer 520 and the time-division-multiplexing measurement optical paths are formed by switching among FBGs in cores of the multi-core fiber stylus 514 and the reference FBG 516. When the spherical tip 515 of the multi-core FBG probe 519 gets contact with a micro part, the multi-core FBG probe 519 deforms and consequent stress distributed along the multi-core fiber stylus 514 shifts reflection spectra of FBGs comprised in the multi-core fiber stylus 514. The reflected light signal is thus changed. The demodulation unit 517 and the signal processing unit 518, the signal processing unit 518 and the measurement computer 520 are linked with electric cable, respectively. The reflected light signal of FBGs in cores of the multi-core fiber stylus 514 of the multi-core FBG probe 519 and the reference FBG 516 is transformed into electric signal by the demodulation unit 517; the electric signal is processed to achieve contact displacements $\Delta X^1$, $\Delta Y^1$ and $\Delta Z^1$ of the spherical tip 515 of the multi-core FBG probe 519 relative to its zero-force position uncoupled with environmental temperature drifts by the differential processing in the signal processing unit 518, and then send to the measurement computer 520 and there linked to coordinate values X, Y, Z of the multi-core FBG probe 519 relative to the coordinate measuring instrument system 51, which are determined using the XYZ-counter 56. Coordinates of contact points can be calculated from coordinate values X, Y, Z of the multi-core FBG probe 519 relative to the coordinate measuring instrument system 51 and contact displacements $\Delta X^1$, $\Delta Y^1$ and $\Delta Z^1$ of the spherical tip 515 of the multi-core FBG probe 519 relative to its zero-force position measured directly using the photoelectric probing system 58. From the values computed in this way, structure geometry of a micro part is determined.

The diameter D of the multi-core fiber without coating used to fabricate the multi-core fiber stylus 514 is usually in the range of 50 μm to 400 μm. The radii of the multi-core fiber's cores are r, and r is normally 4 μm to 6 μm. The distance d from the cores to the center of the multi-core fiber should ensure that the multi-core fiber contains the cores, that is d should be less than 0.5D–r. The multi-core FBG probe 519 can be 3~10 mm long. The diameter ratio of the spherical tip 515 to the multi-core fiber stylus 514 is normally in the range of 1.2~1.5. The horizontal axis is axis x, the vertical axis is axis y, and the axial direction along the multi-core fiber stylus 514 is axis z. The axes x and y are in the section of the multi-core fiber stylus 514, and the origin of axes x and y is at the center of the multi-core fiber stylus 514.

The multi-core FBG probe 519 can be embodied in way 1:

The multi-core fiber stylus 514 of the multi-core FBG probe 519 can be a section of eccentric single-core fiber 61, and the multi-core fiber 513 is the eccentric single-core fiber 61. As shown in FIGS. 6 (a) and (b), the core 62 is located on the negative direction of axis x with a distance of d to the center of the eccentric single-core fiber 61. The multi-core FBG probe 519 fabricated by the eccentric single-core fiber 61 has a two-dimensional measurement capacity in axes z and x. The relationship between spectrum shifts and contact displacements can be analyzed using the theory mentioned in the first purpose of the present invention and expressed as:

$$\begin{cases} v_x = \frac{2(\Delta\lambda_P - \Delta\lambda_R)L^2}{3\lambda d(1-p_e)} \\ v_z = -\frac{(\Delta\lambda_P - \Delta\lambda_R)L}{\lambda(1-p_e)} \end{cases} \quad (6)$$

where, $\lambda$ is the Bragg wavelength of FBG comprised in the core 62 of the eccentric single-core fiber 61 served as the multi-core fiber stylus 514 and the reference FBG 516; $\Delta\lambda_P$ is the spectrum shift of FBG comprised in the core 62 of the eccentric single-core fiber 61 served as the multi-core fiber stylus 514 due to contact displacements and environmental temperature drifts; $\Delta\lambda_R$ is the spectrum shift of FBG comprised in the reference FBG 516 due to environmental temperature drifts; d is the eccentric distance from the core 62 to the center of the eccentric single-core fiber 61; $p_e$ is the effective photoelastic constant, typically 0.213 for a common FBG; L is the length of the multi-core FBG probe 519; $v_x$ and $v_z$ is contact displacements in axes x and z, respectively.

It can be concluded form Eq. (6) that sensing signal of $v_x$ is coupled with $v_z$ in the multi-core FBG probe 519 fabricated by the eccentric single-core fiber 61. Contact displacements in axes x and z can be measured in a time-division-multiplexing way using the demodulation unit 517 and the signal processing unit 518. What is more, the differential calculation of the spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 2:

The multi-core fiber stylus 514 of the multi-core FBG probe 519 can be a section of dual eccentric core fiber 63, and the multi-core fiber 513 is the dual eccentric core fiber 63. As shown in FIGS. 6 (c) and (d), the first core 64 and the second core 65 are located on the negative and direction of axes x and y with a distance of d to the center of the dual eccentric core fiber 63, respectively. The multi-core FBG probe 519 fabricated by the dual eccentric core fiber 63 has a three-dimensional measurement capacity in axes x, y and z. The relationship between spectrum shifts and contact displacements can be analyzed using the theory mentioned in the first purpose of the present invention and expressed as:

$$\begin{cases} v_x = \frac{2(\Delta\lambda_{P1} - \Delta\lambda_R)L^2}{3\lambda d(1-p_e)} \\ v_y = \frac{2(\Delta\lambda_{P2} - \Delta\lambda_R)L^2}{3\lambda d(1-p_e)} \\ v_z = -\frac{(\Delta\lambda_{P1\ or\ 2} - \Delta\lambda_R)L}{\lambda(1-p_e)} \end{cases} \quad (7)$$

where, $\lambda$ is the Bragg wavelength of FBGs comprised in the first core 64 and the second core 65 of the dual eccentric core fiber 63 served as the multi-core fiber stylus 514 and the reference FBG 516; $\Delta\lambda_{P1}$ and $\Delta\lambda_{P2}$ is spectrum shifts of FBGs comprised in the first core 64 and the second core 65 of the dual eccentric core fiber 63 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 64 and the second core 65 to the center of the dual eccentric core fiber 63; $p_e$ is the effective photoelastic constant, typically 0.213 for a common FBG; L is the length of the multi-core FBG probe 519; $v_x$, $v_y$ and $v_z$ is contact displacements in axes x, y and z, respectively.

It can be concluded form Eq. (7) that $v_x$ and $v_y$ can be measured simultaneously. However, sensing signal of $v_x$ and $v_y$ are coupled with $v_z$ in the multi-core FBG probe 519 fabricated by the dual eccentric core fiber 63. Contact displacements in axes x, y and z can be measured in a time-division-multiplexing way using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 3:

The multi-core fiber stylus 514 of the multi-core FBG probe 519 can be a section of eccentric two-core fiber 66, and the multi-core fiber 513 is the eccentric two-core fiber 66. As shown in FIGS. 6 (e) and (f), the first core 67 is located on the negative direction of axis x with a distance of d to the center of the eccentric two-core fiber 66; the second core 68 is located in the center of the eccentric two-core fiber 66. The multi-core FBG probe 519 fabricated by the eccentric two-core fiber 66 has a two-dimensional measurement capacity in axes z and x. The relationship between spectrum shifts and contact displacements can be analyzed using the theory mentioned in the first purpose of the present invention and expressed as:

$$\begin{cases} v_x = \frac{2(\Delta\lambda_{P1} - \Delta\lambda_R)L^2}{3\lambda d(1-p_e)} \\ v_z = -\frac{(\Delta\lambda_{P2} - \Delta\lambda_R)L}{\lambda(1-p_e)} \end{cases} \tag{8}$$

where, $\lambda$ is the Bragg wavelength of FBGs comprised in the first core 67 and the second core 68 of the eccentric two-core fiber 66 served as the multi-core fiber stylus 514 and the reference FBG 516; $\Delta\lambda_{P1}$ and $\Delta\lambda_{P2}$ is spectrum shifts of FBGs comprised in the first core 67 and the second core 68 of the eccentric two-core fiber 66 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 67 to the center of the eccentric two-core fiber 66; $p_e$ is the effective photoelastic constant, typically 0.213 for a common FBG; L is the length of the multi-core FBG probe 519; $v_x$ and $v_z$ is contact displacements in axes x and z, respectively.

It can be concluded form Eq. (8) that $v_x$ and $v_z$ is not coupled with each other. Contact displacements in axes x and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 4:

The multi-core fiber stylus 514 of the multi-core FBG probe 519 can be a section of two-core fiber 69, and the multi-core fiber 513 is the two-core fiber 69. As shown in FIGS. 6 (g) and (h), the first core 610 and the second core 611 are located on the negative and positive direction of axis x with a distance of d to the center of the two-core fiber 69. The multi-core FBG probe 519 fabricated by the two-core fiber 69 has a two-dimensional measurement capacity in axes z and x. The relationship between spectrum shifts and contact displacements can be analyzed using the theory mentioned in the first purpose of the present invention and expressed as:

$$\begin{cases} v_x = \frac{(\Delta\lambda_{P1} - \Delta\lambda_{P2})L^2}{3\lambda d(1-p_e)} \\ v_z = -\frac{\left[\frac{1}{2}(\Delta\lambda_{P1} + \Delta\lambda_{P2}) - \Delta\lambda_R\right]L}{\lambda(1-p_e)} \end{cases} \tag{9}$$

where, $\lambda$ is the Bragg wavelength of FBGs comprised in the first core 610 and the second core 611 of two-core fiber 69 served as the multi-core fiber stylus 514 and the reference FBG 516; $\Delta\lambda_{P1}$ and $\Delta\lambda_{P2}$ is spectrum shifts of FBGs comprised in the first core 610 and the second core 611 of two-core fiber 69 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 610 and the second core 611 to the center of the two-core fiber 69; $p_e$ is the effective photoelastic constant, typically 0.213 for a common FBG; L is the length of the multi-core FBG probe 519; $v_x$ and $v_z$ is contact displacements in axes x and z, respectively.

It can be concluded form Eq. (9) that $v_x$ and $v_z$ is not coupled with each other. Contact displacements in axes x and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 5:

The multi-core fiber stylus 514 of the multi-core FBG probe 519 can be a section of eccentric three-core fiber 612, and the multi-core fiber is the eccentric three-core fiber 612. As shown in FIGS. 6 (i) and (j), the first core 613 and the second core 614 are located on the negative direction of axes x and y axis with a distance of d to the center of the eccentric three-core fiber 612, respectively; the third core 615 is located in the center of the eccentric three-core fiber 612. The multi-core FBG probe 519 fabricated by the eccentric three-core fiber 612 has a three-dimensional measurement capacity in axes x, y and z. The relationship between spectrum shifts and contact displacements can be analyzed using the theory mentioned in the first purpose of the present invention and expressed as:

$$\begin{cases} v_x = \frac{2(\Delta\lambda_{P1} - \Delta\lambda_R)L^2}{3\lambda d(1-p_e)} \\ v_y = \frac{2(\Delta\lambda_{P2} - \Delta\lambda_R)L^2}{3\lambda d(1-p_e)} \\ v_z = -\frac{(\Delta\lambda_{P3} - \Delta\lambda_R)L}{\lambda(1-p_e)} \end{cases} \tag{10}$$

where, $\lambda$ is the Bragg wavelength of FBGs comprised in the first core 613, the second core 614 and the third core 615 of the eccentric three-core fiber 612 served as the multi-core fiber stylus 514 and the reference FBG 516; $\Delta\lambda_{P1}$, $\Delta\lambda_{P2}$ and $\Delta\lambda_{P3}$ is spectrum shifts of FBGs comprised in the first core 613, the second core 614 and the third core 615 of the eccentric three-core fiber 612 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the fiber cores 613 and 614 to the center of the eccentric three-core fiber 612; $p_e$ is the effective photoelastic constant, typically 0.213 for a common FBG; L is the length of the multi-core FBG probe 519; $v_x$, $v_y$ and $v_z$ is contact displacements in axes x, y and z, respectively.

It can be concluded form Eq. (10) that $v_x$, $v_y$ and $v_z$ is not coupled with each other. Contact displacements in axes x, y and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 6:

The multi-core fiber stylus 514 of the multi-core FBG probe 519 can be a section of three-core fiber 616, and the multi-core fiber is the three-core fiber 616. As shown in FIG. 6 (k) and (l), the first core 617, the second core 618 and the third core 619 are located out the center of the three-core fiber 616 with a distance of d to its center; the lines from the first core 617 and the second core 618 to the center of the three-core fiber 616 are beveled at an angle of 30 degree and 150 degree to the negative direction of axis x, respectively; the third core 619 is located on the negative direction of axis y. The multi-core FBG probe 519 fabricated by the three-core fiber 616 has a three-dimensional measurement capacity in axes x, y and z. The relationship between spectrum shifts and contact displacements can be analyzed using the theory mentioned in the first purpose of the present invention and expressed as:

$$\begin{cases} v_x = \frac{(\Delta\lambda_{P1} - \Delta\lambda_{P2})L^2}{\sqrt{3}\lambda d(1 - p_e)} \\ v_y = \frac{(-\Delta\lambda_{P1} - \Delta\lambda_{P2} + 2\Delta\lambda_{P3})L^2}{3\lambda d(1 - p_e)} \\ v_z = -\frac{(\Delta\lambda_{P1\,or\,2\,or\,3} - \Delta\lambda_R)L}{\lambda(1 - p_e)} \end{cases} \quad (11)$$

where, $\lambda$ is the Bragg wavelength of FBGs comprised in the first core 617, the second core 618 and the third core 619 of the three-core fiber 616 served as the multi-core fiber stylus 514 and the reference FBG 516; $\Delta\lambda_{P1}$, $\Delta\lambda_{P2}$ and $\Delta\lambda_{P3}$ is spectrum shifts of FBGs comprised in the first core 617, the second core 618 and the third core 619 of the three-core fiber 616 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 617, the second core 618 and the third core 619 to the center of the three-core fiber 616, respectively; $p_e$ is the effective photoelastic constant, typically 0.213 for a common FBG; L is the length of the multi-core FBG probe 519; $v_x$, $v_y$ and $v_z$ is contact displacements in axes x, y and z, respectively.

It can be concluded form Eq. (11) that $v_x$ and $v_y$ can be measured simultaneously. However, sensing signal of $v_x$ and $v_y$ are coupled with $v_z$ in the multi-core FBG probe 519 fabricated by the three-core fiber 616. Contact displacements in axes x, y and z can be measured in a time-division-multiplexing way using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 7:

The multi-core fiber stylus 514 of the multi-core FBG probe 519 can be a section of eccentric four-core fiber 620, and the multi-core fiber is the eccentric four-core fiber 620. As shown in FIGS. 6 (m) and (n), the first core 621, the second core 622 and the third core 623 are located out the center of the eccentric four-core fiber 620 with a distance of d to its center; the lines from the first core 621 and the second core 622 to the center of the eccentric four-core fiber 620 are beveled at an angle of 30 degree and 150 degree to the negative direction of axis x, respectively; the third core 623 is located on the negative direction of axis y; the fourth core 624 is located in the center of the eccentric four-core fiber 620. The multi-core FBG probe 519 fabricated by the eccentric four-core fiber 620 has a three-dimensional measurement capacity in axes x, y and z. The relationship between spectrum shifts and contact displacements can be analyzed using the theory mentioned in the first purpose of the present invention and expressed as:

$$\begin{cases} v_x = \frac{(\Delta\lambda_{P1} - \Delta\lambda_{P2})L^2}{\sqrt{3}\lambda d(1 - p_e)} \\ v_y = \frac{(-\Delta\lambda_{P1} - \Delta\lambda_{P2} + 2\Delta\lambda_{P3})L^2}{3\lambda d(1 - p_e)} \\ v_z = -\frac{(\Delta\lambda_{P4} - \Delta\lambda_R)L}{\lambda(1 - p_e)} \end{cases} \quad (12)$$

where, $\lambda$ is the Bragg wavelength of FBGs comprised in the first core 621, the second core 622, the third core 623 and the fourth core 624 of the eccentric four-core fiber 620 served as the multi-core fiber stylus 514 and the reference FBG 516; $\Delta\lambda_{P1}$, $\Delta\lambda_{P2}$, $\Delta\lambda_{P3}$ and $\Delta\lambda_{P4}$ is spectrum shifts of FBGs comprised in the first core 621, the second core 622, the third core 623 and the fourth core 624 of the eccentric four-core fiber 620 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 621, the second core 622 and the third core 623 to the center of the eccentric four-core fiber 620, respectively; $p_e$ is the effective photoelastic constant, typically 0.213 for a common FBG; L is the length of the multi-core FBG probe 519; $v_x$, $v_y$ and $v_z$ is contact displacements in axes x, y and z, respectively.

It can be concluded form Eq. (12) that $v_x$, $v_y$ and $v_z$ is not coupled with each other. Contact displacements in axes x, y and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 8:

The multi-core fiber stylus 514 of the multi-core FBG probe 519 can be a section of four-core fiber 625 and the multi-core fiber is the four-core fiber 625. As shown in FIGS. 6 (o) and (p), the first core 626 and the second core 627 are located are located on the negative and positive direction of axis x with a distance of d to the center of four-core fiber 625, respectively; the third core 628 and the fourth core 629 are located on the negative and positive direction of axis y with a distance of d to the center of the four-core fiber 625, respectively. The multi-core FBG probe 519 fabricated by the four-core fiber 625 has a three-dimensional measurement capacity in axes x, y and z. The relationship between spectrum shifts and contact displacements can be analyzed using the theory in the first purpose of the present invention and expressed as:

$$\begin{cases} v_x = \dfrac{(\Delta\lambda_{P1} - \Delta\lambda_{P2})L^2}{3\lambda d(1 - p_e)} \\ v_x = \dfrac{(\Delta\lambda_{P3} - \Delta\lambda_{P4})L^2}{3\lambda d(1 - p_e)} \\ v_z = -\dfrac{\left[\dfrac{1}{4}(\Delta\lambda_{P1} + \Delta\lambda_{P2} + \Delta\lambda_{P3} + \Delta\lambda_{P4}) - \Delta\lambda_R\right]L}{\lambda(1 - p_e)} \end{cases} \quad (13)$$

where, $\lambda$ is the Bragg wavelength of FBGs comprised in the first core 626, the second core 627, the third core 628 and the fourth core 629 of the four-core fiber 625 served as the multi-core fiber stylus 514 and the reference FBG 516; $\Delta\lambda_{P1}$, $\Delta\lambda_{P2}$, $\Delta\lambda_{P3}$ and $\Delta\lambda_{P4}$ is spectrum shifts of FBGs comprised in the first core 626, the second core 627, the third core 628 and the fourth core 629 of the four-core fiber 625 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 626, the second core 627, the third core 628 and the fourth core 629 to the center of the four-core fiber 625, respectively; $p_e$ is the effective photoelastic constant, typically 0.213 for a common FBG; L is the length of the multi-core FBG probe 519; $v_x$, $v_y$, and $v_z$ is contact displacements in axes x, y and z, respectively. It can be concluded form Eq. (13) that $v_x$, $v_y$, and $v_z$ is not coupled with each other. Contact displacements in axes x, y and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The multi-core FBG probe 519 can be embodied in way 9:

The multi-core fiber stylus 514 of the multi-core FBG probe 519 can be a section of five-core fiber 630 and the multi-core fiber is the five-core fiber 630. As shown in FIGS. 6 (q) and (r), the first core 631, the second core 632 are located on the negative and positive direction of axis x with a distance of d to the center of the five-core fiber 630, respectively; the third core 633 and the fourth core 634 are located on the negative and positive direction of axis y with a distance of d to the center of the five-core fiber 630, respectively; the fifth core 635 is located in the center of the five-core fiber 630. The multi-core FBG probe 519 fabricated by the five-core fiber 630 has a three-dimensional measurement capacity in axes x, y and z. The relationship between spectrum shifts and contact displacements can be analyzed using the theory mentioned in the first purpose of the present invention and expressed as:

$$\begin{cases} v_x = \dfrac{(\Delta\lambda_{P1} - \Delta\lambda_{P2})L^2}{3\lambda d(1 - p_e)} \\ v_x = \dfrac{(\Delta\lambda_{P3} - \Delta\lambda_{P4})L^2}{3\lambda d(1 - p_e)} \\ v_z = -\dfrac{(\Delta\lambda_{P5} - \Delta\lambda_R)L}{\lambda(1 - p_e)} \end{cases} \quad (14)$$

where, $\lambda$ is the Bragg wavelength of FBGs comprised in the first core 631, the second core 632, the third core 633, the fourth core 634 and the fifth core 635 of the five-core fiber 630 served as the multi-core fiber stylus 514 and the reference FBG 516; $\Delta\lambda_{P1}$, $\Delta\lambda_{P2}$, $\Delta\lambda_{P3}$, $\Delta\lambda_{P4}$ and $\Delta\lambda_{P5}$ is spectrum shifts of FBGs comprised in the first core 631, the second core 632, the third core 633, the fourth core 634 and the fifth core 635 of the five-core fiber 630 served as the multi-core fiber stylus 514 due to contact displacements and environmental temperature drifts, respectively; $\Delta\lambda_R$ is the spectrum shift of FBG comprised in the reference FBG 516 due to environmental temperature drifts; d is the eccentric distance from the first core 631, the second core 632, the third core 633 and the fourth core 634 to the center of the five-core fiber 630, respectively; $p_e$ is the effective photoelastic constant, typically 0.213 for a common FBG; L is the length of the multi-core FBG probe 519; $v_x$, $v_y$ and $v_z$ is contact displacements in axes x, y and z, respectively.

It can be concluded form Eq. (14) that $v_x$, $v_y$ and $v_z$ is not coupled with each other. Contact displacements in axes x, y and z can be measured simultaneously using the demodulation unit 517 and the signal processing unit 518. What is more, the differential calculation of spectrum shifts of FBGs comprised in the multi-core fiber stylus 514 and the reference FBG 516 can compensate common-mode environmental temperature drifts to ensure measurement results are not influenced by environment.

The equipment based on multi-core FBG probe 519 for measuring structures of a micro part can be embodied in way 1:

The equipment based on multi-core FBG probe 519 for measuring structures of a micro part is shown in FIG. 5. The light source 59 can be a broadband ASE source. When the light source 59 is a broadband ASE source, the reflected light signal is reflection spectra of FBGs and the demodulation unit 517 can be an optical spectrum analysis device 71 as shown in FIG. 7 (a).

The optical spectrum analysis device 71 has an optical input port 72 and an electric output port 73. The reflected spectra of FBGs comprised in the multi-core FBG probe 519 and the reference FBG 516 are analyzed by the optical spectrum analysis device 71, and the spectrum signal is transformed into electric signal; the electric signal is received and processed in the signal processing unit 518 using the Eq. (6)~(14) according to the embodiments of the multi-core FBG probe 519 to achieve contact displacements $\Delta X^1$, $\Delta Y^1$ and $\Delta Z^1$ of the spherical tip 515 of the multi-core FBG probe 519 relative to its zero-force position uncoupled with environmental temperature drifts.

The equipment based on multi-core FBG probe 519 for measuring structures of a micro part can be embodied in way 2:

The equipment based on multi-core FBG probe 519 for measuring structures of a micro part is shown in FIG. 5. The light source 59 can be a broadband ASE source. When the light source 59 is a broadband ASE source, the reflected light signal is reflection spectra of FBGs and the demodulation unit 517 can be also a matching FBG pair demodulation system 74 which consists of a 50:50 coupler 75, a demodulation FBG 76 and a multi-channel optical power measuring device 77 as shown in FIG. 7 (b). The matching FBG pair demodulation system 74 has an optical input port 78 and an electric output port 79.

When the measured spectrum 710 enters the optical input port 78 of the matching FBG pair demodulation system 74, the measured spectrum 710 is divided by the 50:50 coupler 75 into two parts, one part 711 is received by a detector of the multi-channel optical power measuring device 77, and the other part 711' enters the demodulation FBG 76 with a fixed reflection spectrum 712. The spectrum 711' is filtered and then reflected by the demodulation FBG 76, and the spectrum overlap 713 of the spectrum 711' and the spectrum 712 enters the other detector of the multi-channel optical power measuring device 77. When the measured spectrum shifts to 714, the optical power ratio of the spectrum overlap 713 and 716 of the spectrum 715' and the spectrum 712 to the spectrum 715 related to the measured spectrum 714 changes and is not affect by the input optical power. Therefore, the optical power ratio of the multi-channel optical power measuring device 77 can be used to measure the shift of the measured spectrum. Reflected spectra of FBGs comprised in the multi-core fiber stylus 514 of the multi-core FBG probe 519 and the reference FBG 516 are analyzed by the matching FBG pair demodulation system 74, and the spectrum signal is transformed into electric signal; the electric signal is received and processed in the signal processing unit 518 using the Eq. (6)~(14) according to the embodiments of the multi-core FBG probe 519 to achieve contact displacements $\Delta X^1$, $\Delta Y^1$ and $\Delta Z^1$ of the spherical tip 515 of the multi-core FBG probe 519 relative to its zero-force position uncoupled with environmental temperature drifts.

The equipment based on multi-core FBG probe 519 for measuring structures of a micro part can be embodied in way 3:

The equipment based on multi-core FBG probe 519 for measuring structures of a micro part is shown in FIG. 5. The light source 59 can be a narrowband laser source. When the light source 59 is a narrowband laser source, the demodulation unit 517 can be a multi-channel optical power measuring device 717 as shown in FIG. 7 (c). The multi-channel optical power measuring device 717 has two optical input ports 718 and 719, and an electric output port 720. The spectrum 721 of the narrowband laser source 59 is located in the range of reflection spectra of FBGs comprised in the multi-core fiber stylus 514 of the multi-core FBG probe 519 and the reference FBG 516.

The light spectrum 721 of the narrowband laser source 59 is reflected by the measured FBG spectrum 722 and enters the multi-channel optical power measuring device 717 through the port 718. A part of light coming from the narrowband laser source 59 enters the multi-channel optical power measuring device 717 through the port 719 for optical power reference. The optical power of the reflected light signal is in related to the reflectivity of the measured FBG at the spectrum wavelength 721 of the narrowband laser source, and varies with the spectrum shift of the measured FBG from 722 to 723. Therefore, the optical power ratio of the multi-channel optical power measuring device 717 can be used to measure the shift of the measured spectrum. Reflected spectra of FBGs comprised in the multi-core fiber stylus 514 of the multi-core FBG probe 519 and the reference FBG 516 are analyzed by the multi-channel optical power measuring device 717, and the spectrum signal is transformed into electric signal; the electric signal is received and processed in the signal processing unit 518 using the Eq. (6)~(14) according to the embodiments of the multi-core FBG probe 519 to achieve contact displacements $\Delta X^1$, $\Delta Y^1$ and $\Delta Z^1$ of the spherical tip 515 of the multi-core FBG probe 519 relative to its zero-force position uncoupled with environmental temperature drifts.

What is claimed is:
1. A method based on multi-core FBG probe for measuring structures of a micro part includes following steps:
Step 1. Providing a multi-core FBG probe, which comprises a spherical tip and a multi-core fiber stylus inscribed FBGs in its cores; the multi-core fiber stylus, cantilevered at one end and with the spherical tip fixed on the other, serves as the multi-core FBG probe; the multi-core fiber utilized to fabricate the multi-core fiber stylus should have one or more cores located out of the center of the multi-core fiber;
Step 2. Providing a photoelectric probing system, which consists of the multi-core FBG probe mentioned in step 1, an optical path for the operation of the multi-core FBG probe, and an interrogation unit (consisting of a demodulation unit and a signal processing unit) for detecting and processing the sensing signal of the multi-core FBG probe; when a micro part is measured, the spherical tip of the multi-core FBG probe is brought into contact with a micro part and the spectra of FBGs comprised in the multi-core fiber stylus shift accordingly; the optical path supplies the multi-core FBG probe with energy and ensures the sensing signal containing spectrum shifts of FBGs in the multi-core fiber stylus and the reference FBG can reach the interrogation unit; the interrogation unit detects the sensing signal, transforms it into spectrum shifts of FBGs, and then calculates contact displacements of the spherical tip of the multi-core FBG probe relative to its zero-force position;
Step 3. Combining the photoelectric probing system mentioned in step 2 with a coordinate measuring instrument system to form an equipment based on multi-core FBG probe for measuring structures of a micro part, contact displacements of the spherical tip of the multi-core FBG probe and coordinates of the multi-core FBG probe relative to the coordinate measuring instrument system are acquired in real time and are processed by a measurement computer, wherein coordinates of contact points can be calculated from coordinates of the multi-core FBG probe relative to the coordinate measuring instrument system and contact displacements of the spherical tip of the multi-core FBG probe relative to its zero-force position measured directly using the photoelectric probing system;
Step 4. A micro part measured is fastened to a measurement table of the equipment based on multi-core FBG probe for measuring structures of a micro part mentioned in step 3; the motion of the measurement table and the multi-core FBG probe fixed on the sleeve of the equipment is controlled by manual operation or a measurement program; relative motion between the multi-core FBG probe and a micro part occurs and the motion track is accurately designed to bring the spherical tip of the multi-core FBG probe into contact with a certain point of a micro part, coordinates of a contact point can be calculated in the measurement computer mentioned in step 3;

Step 5. Repeat the measurement process in step 4 to obtain coordinates of more contact points and the structure geometry of a micro part measured can be reconstructed from coordinates of these contact points.

2. The equipment based on multi-core FBG probe 519 for measuring structures of a micro part comprises:

a photoelectric probing system 58 consists of:
  a multi-core FBG probe 519 for sensing contact displacements consisting of a multi-core fiber stylus 514 inscribed FBGs in its cores and a spherical tip 515 fixed on the top of the multi-core fiber stylus 514,
  a light source 59 for supplying light energy for the multi-core FBG probe 519,
  an optical circulator 510,
  a multi-channel optical switch 511 for switching optical paths to measure the spectra of FBGs in a time-division-multiplexing way,
  a multi-core fiber fan-out 512 for making single mode fiber access to every core of the multi-core fiber stylus 514,
  a multi-core fiber 513 for connecting the multi-core fiber fan-out 512 with the multi-core fiber stylus 514,
  a reference FBG 516 for compensating environment temperature drifts,
  a demodulation unit 517 for detecting spectrum signal and transforming it into electric signal,
  a signal processing unit 518 for processing electric signal and calculating contact displacements $\Delta X^1$, $\Delta Y^1$ and $\Delta Z^1$ of the spherical tip 515 of the multi-core FBG probe 519 relative to its zero-force position;
  wherein, the photoelectric probing system 58 makes the multi-core FBG probe 519 working, demodulates the sensing signal and extracts contact displacements $\Delta X^1$, $\Delta Y^1$ and $\Delta Z^1$ of the spherical tip 515 of the multi-core FBG probe 519 relative to its zero-force position, and
  the light source 59 and the optical circulator 510, the optical circulator 510 and the multi-channel optical switch 511, the multi-channel optical switch 511 and the multi-core fiber fan-out 512, the multi-channel optical switch 511 and the reference FBG 516, and the optical circulator 511 and the demodulation unit 517 are linked with single mode fiber, respectively; the multi-core fiber fan-out 512 and the multi-core fiber stylus 514 of the multi-core FBG probe 519 are linked with the multi-core fiber 513; the demodulation unit 517 and the signal processing unit 518 are linked with electric cable;

a coordinate measuring instrument system 51 consists of:
  a crosspiece 52,
  a sleeve 53 adjustable in the X and Z direction with the multi-core FBG probe 519 fixed on it,
  a measurement table 54 movable in the Y direction with a micro part being measured fastened to it for motion in axis y,
  an instrument basement 55 for supporting and driving the measurement table 54 and the sleeve 53 through the crosspiece 52,
  a XYZ-counter 56 for determining coordinate values X, Y, Z of the coordinate measuring instrument system 51,
  a Computer Numerical Controller (CNC) controller 57 for controlling the motion of the sleeve 53 and the measurement table 54;
  wherein, the coordinate measuring instrument system 51 is controlled by the CNC controller 57 to implement the whole measuring process, and accurate coordinates of the multi-core FBG probe 519 relative to the coordinate measuring instrument system 51 are determined by the CNC controller 57, and
  the crosspiece 52 and the sleeve 53 adjustable in the X and Z direction, the crosspiece 52 and the instrument basement 55, the measurement table 54 movable in the Y direction and the instrument basement 55 are linked with mechanical structures, respectively; the sleeve 53 adjustable in the X and Z direction and the XYZ-counter 56, the measurement table 54 movable in the Y direction and the XYZ-counter 56, the instrument basement 55 and the CNC controller 57 are linked with electric cable, respectively;

a measurement computer 520 which is utilized to calculate coordinates of a micro part measured using results of the coordinate measuring instrument system 51 and the photoelectric probing system 58, and plan the measuring process and send motion signal to the CNC controller 57 of the coordinate measuring instrument system 51,
  wherein, the multi-channel optical switch 511 is controlled by the measurement computer 520 for switching optical paths to measure FBGs comprising in the multi-core fiber stylus 514 of the multi-core FBG probe 519 and the reference FBG 516, and
  the XYZ-counter 56 and the measurement computer 520, and the CNC controller 57 and the measurement computer 520, the multi-channel optical switch 511 and the measurement computer 520, and the signal processing unit 518 and the measurement computer 520 are linked with electric cable, respectively.

3. The equipment based on multi-core FBG probe 519 for measuring structures of a micro part of claim 2, wherein the light source 59 can be a broadband ASE source, and the demodulation unit 517 can be an optical spectrum analysis device 71; the optical spectrum analysis device 71 has an optical input port 72 and an electric output port 73.

4. The equipment based on multi-core FBG probe 519 for measuring structures of a micro part of claim 2, wherein the light source 59 can be a broadband ASE source, and the demodulation unit 517 can be a matching FBG pair demodulation system 74 consisting of a 50:50 coupler 75, a demodulation FBG 76 and a multi-channel optical power measuring device 77; the matching FBG pair demodulation system 74 has an optical input port 78 and an electric output port 79.

5. The equipment based on multi-core FBG probe 519 for measuring structures of a micro part of claim 2, wherein the light source 59 can be a narrowband laser source, and the demodulation unit 517 can be a multi-channel optical power measuring device 717; the multi-channel optical power measuring device 717 has two optical input ports 718 and 719, and an electric output port 720.

6. The equipment based on multi-core FBG probe 519 for measuring structures of a micro part of claim 2, wherein the multi-core fiber stylus 514 of the multi-core FBG probe 519 can be a section of eccentric single-core fiber 61, and wherein said multi-core fiber 513 is the eccentric single-core fiber 61; the core 62 is located on the negative direction of horizontal axis with a distance of d to the center of the eccentric single-core fiber 61.

7. The equipment based on multi-core FBG probe 519 for measuring structures of a micro part of claim 2, wherein the multi-core fiber stylus 514 of the multi-core FBG probe 519 can be a section of dual eccentric core fiber 63, and wherein said multi-core fiber 513 is the dual eccentric core fiber 63; the first core 64 and the second core 65 are located on the negative direction of horizontal axis and vertical axis with a distance of d to the center of the dual eccentric core fiber 63, respectively.

8. The equipment based on multi-core FBG probe 519 for measuring structures of a micro part of claim 2, wherein the multi-core fiber stylus 514 of the multi-core FBG probe 519 can be a section of eccentric two-core fiber 66, and wherein said multi-core fiber 513 is the eccentric two-core fiber 66; the first core 67 is located on the negative direction of horizontal axis with a distance of d to the center of the eccentric two-core fiber 66; the second core 68 is located in the center of the eccentric two-core fiber 66.

9. The equipment based on multi-core FBG probe 519 for measuring structures of a micro part of claim 2, wherein the multi-core fiber stylus 514 of the multi-core FBG probe 519 can be a section of two-core fiber 69, and wherein said multi-core fiber 513 is the two-core fiber 69; the first core 610 and the second core 611 are located on the negative and positive direction of horizontal axis with a distance of d to the center of the two-core fiber 69.

10. The equipment based on multi-core FBG probe 519 for measuring structures of a micro part of claim 2, wherein the multi-core fiber stylus 514 of the multi-core FBG probe 519 can be a section of eccentric three-core fiber 612, and wherein said multi-core fiber 513 is the eccentric three-core fiber 612; the first core 613 and the second core 614 are located on the negative direction of horizontal axis and vertical axis with a distance of d to the center of the eccentric three-core fiber 612, respectively; the third core 615 is located in the center of the eccentric three-core fiber 612.

11. The equipment based on multi-core FBG probe 519 for measuring structures of a micro part of claim 2, wherein the multi-core fiber stylus 514 of the multi-core FBG probe 519 can be a section of three-core fiber 616, and wherein said multi-core fiber 513 is the three-core fiber 616; the first core 617, the second core 618 and the third core 619 are located out the center of the three-core fiber 616 with a distance of d to its center; the lines from the first core 617 and the second core 618 to the center of the three-core fiber 616 are beveled at an angle of 30 degree and 150 degree to the negative direction of horizontal axis, respectively; the third core 619 is located on the negative direction of vertical axis.

12. The equipment based on multi-core FBG probe 519 for measuring structures of a micro part of claim 2, wherein the multi-core fiber stylus 514 of the multi-core FBG probe 519 can be a section of eccentric four-core fiber 620, and wherein said multi-core fiber 513 is the eccentric four-core fiber 620; the first core 621, the second core 622 and the third core 623 are located out the center of the eccentric four-core fiber 620 with a distance of d to its center; the lines from the first core 621 and the second core 622 to the center of the eccentric four-core fiber 620 are beveled at an angle of 30 degree and 150 degree to the negative direction of horizontal axis, respectively; the third core 623 is located on the negative direction of vertical axis; the fourth core 624 is located in the center of the eccentric four-core fiber 620.

13. The equipment based on multi-core FBG probe 519 for measuring structures of a micro part of claim 2, wherein the multi-core fiber stylus 514 of the multi-core FBG probe 519 can be a section of four-core fiber 625, and wherein said multi-core fiber 513 is the four-core fiber 625; the first core 626 and the second core 627 are located are located on the negative and positive direction of horizontal axis with a distance of d to the center of the four-core fiber 625, respectively; the third core 628 and the fourth core 629 are located on the negative and positive direction of vertical axis with a distance of d to the center of the four-core fiber 625, respectively.

14. The equipment based on multi-core FBG probe 519 for measuring structures of a micro part of claim 2, wherein the multi-core fiber stylus 514 of the multi-core FBG probe 519 can be a section of five-core fiber 630, and wherein said multi-core fiber 513 is the five-core fiber 630; the first core 631 and the second core 632 are located on the negative and positive direction of horizontal axis with a distance of d to the center of the five-core fiber 630, respectively; the third core 633 and the fourth core 634 are located on the negative and positive direction of vertical axis with a distance of d to the center of the five-core fiber 630, respectively; the fifth core 635 is located in the center of the five-core fiber 630.

* * * * *